3,078,235
Patented Feb. 19, 1963

3,078,235
LIQUID ANHYDRIDE HARDENER COMPOSITIONS FOR EPOXY RESINS
Robert Laurence Bowman and James Richard Hinkley, St. Paul, Minn., assignors to Minnesota Mining and Manufacturing Company, St. Paul, Minn., a corporation of Delaware
No Drawing. Filed Oct. 24, 1958, Ser. No. 769,305
2 Claims. (Cl. 252—182)

This invention relates to liquid compositions of matter useful as co-reactants with epoxy resins and their use in combination with the epoxy resins. More specifically, this invention relates to liquid mixtures of normally solid cyclic dicarboxylic anhydrides.

It has been discovered that liquid mixtures of at least 2 normally solid cyclic dicarboxylic acid anhydrides having a melting point above 22° C., will react with epoxy resins to give a final product having useful properties as potting, casting and impregnating compositions. In each instance, the solid anhydrides contained in the mixture form a liquid at 22° C., without the addition of a diluent or liquid component.

It has further been discovered that a mixture of allo-ocimene-maleic anhydride adduct with other solid maleic anhydride adducts results in liquid products in which essentially all the ingredients of the composition will react with epoxy resins to form products having substantially the same useful properties as when allo-ocimene-maleic anhydride adduct is employed by itself.

One of the unique features of this invention is the fact that the mixture of co-reactants is a liquid which may be reacted with epoxy resins to produce heat distortion temperatures which are ordinarily only obtainable with solid curing agents. They will find their greatest usage in combination with liquid epoxy resins and such combination is a preferred embodiment of this invention although they may also be employed to cure solid epoxy resins. When employed with liquid epoxy resins, they form liquid casting and potting compositions at room temperature having a long pot life, and this feature of the invention makes them especially useful in this type of application.

Illustrative normally solid cyclic dicarboxylic anhydrides which may be employed in the practice of this invention are allo-ocimene-maleic anhydride adduct M.P. 84° C., tetrahydrophthalic anhydride M.P. 101° C., hexahydrophthalic anhydride M.P. 35° C., myrcene-maleic anhydride adduct M.P. 28° C., isoprene-maleic anhydride adduct M.P. 60° C., phthalic anhydride M.P. 131° C., and cyclopentadiene-maleic anhydride adduct M.P. 165° C., and maleic anhydride M.P. 60° C.

As employed in this specification, the term "epoxy resin" relates to poly-epoxide compounds which contain reactive vicinal epoxy linkages available as a reaction situs. Epoxy resins which have enjoyed a high degree of commercial success are those resins prepared from epichlorohydrin and polyhydric phenols, such as 2,2'-bis-(p-hydroxy phenyl) propane and resorcinol. A second class of epoxy resins are those prepared from polyhydric alcohols such as glycerine and pentaerythritol and epichlorohydrin. Another class of epoxy resins are those prepared from epichlorohydrin and amines containing reactive hydrogen atoms. A still further class of epoxy resins are those prepared by the direct epoxidation of aliphatic or aromatic unsaturated compounds. These resins and compositions containing these resins are classified by the Patent Office in Class 260 sub-classes 2, 42, 47, and 348, and reference thereto may be had for the early patents as well as the most recent patent publications on current developments in this field. Throughout these sub-classes are described various products and their method of preparation and these resins are useful in the practice of this invention. The preferred compositions of this invention are those directed to the new and useful co-reactants with the above-defined classes of epoxy resin, and mixtures thereof. Because the above-mentioned classes of compounds are currently enjoying greater and greater commercial success, it is recognized that other epoxy resins containing an average vicinal epoxy group content of more than 1 will be developed that are useful in the practice of this invention. As with those epoxy resins presently available, the preferred compounds are those containing more than 1 and less than 3 vicinal epoxy groups per molecule and mixtures containing a preponderance of these compounds.

This invention may be illustrated further by reference to the following examples in which all "parts" are expressed as parts by weight and all "percentages" are expressed as percent by weight, unless specified otherwise.

EXAMPLE I (A) *Preparation of Allo-Ocimene-Maleic Anhydride Adduct*

A reaction vessel is charged with maleic anhydride (5,000 lbs.) and heated to 150° F. Due to the exothermic nature of the reaction, allo-ocimene is added to the reaction vessel in small increments so as to maintain the reaction temperature within the range of 150–160° F., until a total of 7,000 lbs. has been added. The reaction vessel is then heated to 200° F., for a period of two and one half hours, the last 30 minutes of which a vacuum of 20–40 mm. of Hg is applied to the vessel. The reaction product allo-ocimene-maleic anhydride adduct is filtered as it is removed from the reaction vessel and placed in a storage container.

(B) *Preparation of Liquid Curing Agent*

Allo-ocimene-maleic anhydride adduct (80 grams) was mixed at room temperature with hexahydrophthalic anhydride (120 grams) and tris-2,4,6-(dimethyl aminomethyl) phenol (0.5 gram) to prepare a liquid curing agent.

(C) *Curing Epoxy Resins*

50 grams of the liquid anhydride mixture prepared as shown in (B) above was reacted with 50 grams of an epoxy resin having an epoxy equivalency of about 200, i.e., approximately 200 grams of resin contains one gram-equivalent of epoxide, and prepared from bis-phenol A and epichlorohydrin, by heating the mixture in an oven maintained at 120° C., for a period of 1 hour. The resulting product was a hard, clear, yellow casting.

In order to test the thermal shock resistance, a sample was cured in a 5/8" thick by 2" diameter patty with a 1/2" hexagonal machine nut embedded in the center having the threaded hole of the nut concentric along the vertical axis of the patty and the bottom surface of the nut exposed in the bottom surface of the patty. This test is referred to as the nut test, and the temperature at which cracking occurs demonstrates its utility in the encapsulation of metallic parts such as transformer windings. The above patty did not crack at room temperature.

Similar successful results were observed in the "Steel Block Test" wherein a 1 inch steel cube was embedded in a cylinder (2¼" diameter x 1⅜" high) of the resin components of part (C) above. After curing, the cylinder was cooled to —27° C., and was intact at the end of one hour at this reduced temperature.

Compositions containing the same weight ratio of epoxy resin to anhydride mixture of allo-ocimene-maleic anhydride adduct and hexahydrophthalic anhydride were prepared and cured in admixture with various fillers, catalysts at various concentrations and in the absence of a catalyst to produce results substantially the same as above. Among the catalysts employed, were dimethyl benzyl amine, dimethyl dioctadecyl ammonium bentonite, and zinc octoate-diethylaminopropyl amine.

The mixture of part (C) above containing only 0.24 gram of the same amine catalyst was tested in order to evaluate its stability at room temperature (22° C.). Its stability, or pot life, was determined by measuring its viscosity at various intervals and the results of these determinations were as follows:

| Time (hours): | Viscosity (centiposes at 25° C.) |
|---|---|
| 0 | 1370 |
| 66.5 | 2930 |
| 97 | 4170 |
| 128 | 5150 |
| 173 | 6725 |

Accordingly, it can be seen that the mixture was still a liquid after being stored at room temperature for over one week.

EXAMPLE II

The liquid mixture of allo-ocimene-maleic acid adduct and hexahydrophthalic acid (47 grams) prepared as shown in part (B) of Example I was added to an epoxy resin mixture containing approximately 45 grams of an epoxy resin derived from epichlorohydrin and bis-phenol A having an epoxy equivalent of about 190 and 5 grams of diglycidyl ether of 1,8-bis-(p-hydroxy-phenyl) pentadecane. The resulting mixture was cured to a rigid patty by heating it in an oven at 120° C., for 120 minutes.

EXAMPLE III

An epoxy resin mixture having an epoxy equivalency of 206, and a viscosity of about 14,000 centiposes was prepared by mixing 60 parts by weight of epoxy resin A, a condensation product of epichlorohydrin and 2,2'-bis-(p-hydroxy phenyl) propane having an epoxy equivalency of 262, and 40 parts by weight of epoxy resin B, a condensation product of epichlorohydrin and resorcinol having an epoxy equivalency of 157.

Allo-ocimene-maleic anhydride adduct (19 grams), hexahydrophthalic anhydride (28 grams) and tris-2,4,6-(di-methyl amino-methyl) phenol (0.06 gram) were mixed with the above epoxy resin mixture (53 grams) and cured for 2 hours at 250° F. The resulting product had a Barcol hardness of 32.

EXAMPLE IV

Maleic anhydride (34.6 lbs.) is charged to the reaction vessel and heated to 145° F. Myrcene (64 lbs.) is added slowly to the vessel, and the temperature of the reactants is maintained below 150° F., until all the myrcene is added. After the addition of myrcene is completed, the reaction vessel is heated to 200° F., for two hours. It is then permitted to cool to 150° F., at which temperature the pressure in the vessel is slowly reduced to 20–30 mm., and the temperature raised to 300° F. When all the distillate has been removed, in this manner, the reaction vessel is cooled to 175° F., and the reaction product, myrcene-maleic anhydride adduct, is drained into a storage container.

Equal parts of myrcene-maleic anhydride adduct, prepared as shown above, and allo-ocimene-maleic anhydride adduct, prepared as shown in Example I, were mixed and melted to produce a liquid having a viscosity of 190 centipoises at 25° C.

An epoxy resin (45 grams) having an epoxy equivalency of about 200 prepared by reacting epichlorohydrin with bis-phenol A, was mixed with the above anhydride mixture (55 grams) and tris-2,4,6-(dimethyl aminomethyl) phenol (0.06 gram) to produce a liquid reaction mixture having a viscosity of 950 centipoises at 25° C. Upon being cured, at 250° F., for 11 hours, the resulting product had a Barcol hardness of 27.

EXAMPLE V

Myrcene-maleic anhydride adduct (60 grams) and allo-ocimene-maleic anhydride adduct (40 grams) were mixed to produce a liquid having a viscosity of 170 centipoises at 25° C. Upon reacting this mixture (55 grams) with 45 grams of a bis-phenol A-epichlorohydrin epoxy resin having an epoxy equivalency of 200 in the presence of 0.125 gram of tris-2,4,6-(dimethyl amino-methyl) phenol for 10 hours at 250° F., the resulting product had a Barcol hardness of 31.

EXAMPLE VI

Myrcene-maleic anhydride adduct (40 grams) and allo-ocimene-maleic anhydride adduct (60 grams) were mixed to produce a liquid having a viscosity of 295 centipoises to 25° C. Upon reacting this mixture (55 grams) with 45 grams of a bis-phenol A-epichlorohydrin epoxy resin having an epoxy equivalency of 200 in the presence of tris-2,4,6-(dimethyl amino-methyl) phenol (0.125 gram) for 10 hours at 250° F., the resulting product had a Barcol hardness of 35.

EXAMPLE VII

Allo-ocimene-maleic anhydride adduct (50 parts), myrcene-maleic anhydride adduct (25 parts) and isoprene-maleic anhydride adduct (25 parts) were mixed to produce a liquid having a viscosity of 195 centipoises at 25° C. This anhydride mixture (59 parts) was mixed with a liquid epoxy resin having an epoxy equivalency of about 200 and prepared by condensing bis-phenol A and epichlorohydrin (41 parts) to produce a liquid mixture having a viscosity of 1910 centipoises at 25° C. The solid product resulting from the curing of this mixture had a Barcol hardness of 16.

EXAMPLE VIII

Allo-ocimene-maleic anhydride adduct (35 grams) isoprene-maleic anhydride adduct (45 grams), myrcene-maleic anhydride (20 grams) and tris-2,4,6-(dimethyl amino-methyl) phenol (0.33 gram) were mixed to produce a liquid co-reactant for epoxy resins. When 40 grams of the above liquid mixture was added to 40 grams of an epoxy resin having an epoxy equivalency of about 200, there resulted a final product which had a Barcol hardness of 30 and in the "nut test" did not crack at —10° C.

EXAMPLE IX

Myrcene-maleic anhydride adduct (50 grams), allo-ocimene-meleic anhydride adduct (50 grams), and hexahydrophthalic anhydride (100 grams) were mixed to produce a liquid having a viscosity of 80 centipoises at 25° C. The above mixture (50 grams) and 50 grams of a liquid epoxy resin having an epoxy equivalency of about 200 were mixed with 0.06 gram of a tertiary amine catalyst to produce a composition having a viscosity of 520 centipoises at 25° C. After curing this mixture at 250° F., for 10 hours, the resulting product had a Barcol hardness of 32.

Due to its low viscosity and high heat distortion characteristics, the anhydride system of Example IX was selected for detailed study in a designed experiment. This designed experiment was set up to ascertain the composition having a sufficiently low viscosity at room temperature and the desired heat distortion temperature. The details for running any such experiment may be found in "Design and Analysis of Industrial Experiments" edited by Owen L. Davies (1956). Obviously, in any given situation, or combination of anhydrides, it is a simple matter of mixing to determine whether or not the system is liquid.

As a result of the designed experiment, it was determined that the composition of Example X below has a viscosity low enough at room temperature that the composition can be subjected to low temperatures and also produce final products having a sufficiently high heat distortion temperature.

EXAMPLE X

Hexahydrophthalic anhydride (49.1 lbs.) and myrcene-maleic anhydride adduct (11.3 lbs.) are added to a vessel and heated to 140° F., with agitation. Allo-ocimene-meleic anhydride adduct (39.2 lbs.) is then added, and the three anhydrides are stirred until a uniform and homogeneous liquid is formed which has a solidification point of 8° F. If an activator is to be included, it is convenient to add it at this point. The liquid is then filtered and drained into a storage container.

The composition of Example X, when mixed with an equal weight of an epoxy resin having an epoxy equivalency of about 200, and prepared from bis-phenol A and epichlorohydrin, is particularly useful as an impregnant for electrical coils because of its low viscosity and long pot-life. The initial room temperature viscosity of about 1600 centistokes which is readily reduced to less than 300 centistokes at 120° F., permits rapid impregnation of the copper wire and paper interlayer insulation of a tightly wound electrical coil. A void-free and well insulated coil results from immersion in the mixture under vacuum at 120° F., for one hour and then baking for two hours at 250° F.

This mixture, when modified with talc as a filler, was employed as an encapsulating compound for the coil, impregnated as described above. In the encapsulating step, the coil is potted in a mold and cured for two hours at 250° F. The resulting product had good dielectric properties and was useful at temperatures up to 356° F., and above since the weight loss after aging for 250 hours at 356° F., was about 0.2% by weight of the total resin content.

The low viscosity of this composition permits the addition of up to 50% by weight of an inorganic filler which reduces cost, increases thermal conductivity, and improves thermal and mechanical shock resistance.

It should be noted that not all mixtures of the various anhydrides will be liquids. In the light of the data gathered and carried out in the designed experiment, it was calculated that at least 20% by weight of allo-ocimene-maleic anhydride adduct must be present in the mixture and that the preferred system could range from 20 to 60 parts by weight of allo-ocimene-maleic anhydride adduct, 10 to 80 parts by weight of myrcene-maleic-anhydride adduct and 0 to 60 parts by weight of hexahydrophthalic anhydride. It will also be appreciated that there may be isolated combinations falling within the above ranges which are solids at room temperature whereas the compositions suitable for use in this invention must be liquid at room temperatures. Likewise, various isolated compositions falling outside the above ranges may be liquids at room temperatures, and these, of course, are suitable compositions. Based on the results of the designed experiment, it is thought that the above ranges do encompass all compositions having less than 2,000 centistokes at 22° C., and these compositions are the most preferred since fewer problems are encountered in handling and storing of these compositions under ordinary warehousing conditions. For instance, it is desirable to prevent the solidification of the mixture after its initial preparation, but if the mixture does solidify, it is advantageous to have a mixture that may be easily liquefied. Accordingly, a further preference is that the anhydride mixture composition have a solidification point of less than 40° F.

Various ingredients such as coloring, fillers, antifoam agents and viscosity control agents, may be added to the liquid mixture of anhydride adducts depending on the application and use to which the composition is to be employed. For instance, in coating transformers with the liquid combination of maleic anhydride adducts, a viscosity control agent, such as dimethyl dioctadecyl ammonium bentonite, and a filler, such as talc, can be added to advantage.

Thus, various preferred embodiments of this invention have been set forth in the foregoing specification and it is apparent that numerous modifications in these embodiments may be made without departing from the coverage intended by the appended claims.

We claim:
1. For use with liquid epoxide resins in the preparation of liquid self-reactive resinous impregnating compositions having moderately prolonged pot life, curing to a hard tough resinous state, and suitable for filling and encapsulating of electrical coils as herein described, a liquid anhydride hardener composition consisting essentially of (a) the solid adduct of allo-ocimene and maleic anhydride, (b) the solid adduct of myrcene and maleic anhydride, and (c) hexahydrophthalic anhydride, in relative proportions selected to provide a liquid and from within the approximate limits of 20 to 60 parts of (a), 10 to 80 parts of (b), and 0 to 60 parts of (c).

2. For use with liquid epoxide resins in the preparation of liquid self-reactive resinous impregnating compositions having moderately prolonged pot life, curing to a hard, tough resinous state, and suitable for filling and encapsulating of electrical coils as herein described, a liquid anhydride hardener composition, a liquid mixture of about 40 parts of the solid adduct of allo-ocimene and maleic anhydride, 10 parts of the solid adduct of myrcene and maleic anhydride and 50 parts of hexahydrophthalic anhydride.

References Cited in the file of this patent

UNITED STATES PATENTS

| 2,744,845 | Rudoff | May 8, 1956 |
| 2,801,229 | De Hoff et al. | July 30, 1957 |
| 2,839,495 | Carey | June 17, 1958 |